(12) United States Patent
Mi et al.

(10) Patent No.: US 8,602,628 B2
(45) Date of Patent: Dec. 10, 2013

(54) LIGHT GUIDE PLATES HAVING A TWO-DIMENSIONAL PATTERN COMPRISING SUBSTANTIALLY IDENTICAL MICRO-LENSES

(75) Inventors: Xiang-Dong Mi, Northborough, MA (US); Ju-Hyun Lee, Westborough, MA (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 230 days.

(21) Appl. No.: 13/316,122

(22) Filed: Dec. 9, 2011

(65) Prior Publication Data

US 2013/0148378 A1    Jun. 13, 2013

(51) Int. Cl.
*F21V 7/04*    (2006.01)
(52) U.S. Cl.
USPC ............ 362/616; 362/619; 362/627; 362/330
(58) Field of Classification Search
None
See application file for complete search history.

(56) References Cited

U.S. PATENT DOCUMENTS

| 7,097,341 | B2 | 8/2006 | Tsai | |
| 2005/0041177 | A1* | 2/2005 | Watanabe | 349/64 |
| 2009/0257001 | A1* | 10/2009 | Sumida et al. | 362/616 |
| 2009/0296019 | A1* | 12/2009 | Lee et al. | 362/19 |

* cited by examiner

*Primary Examiner* — Britt D Hanley
(74) *Attorney, Agent, or Firm* — Edwin Oh

(57) ABSTRACT

The present invention provides a light guide plate comprising an input surface for receiving light from a plurality of discrete light sources, an output surface for emitting light, and a bottom surface opposing to the output surface, wherein at least one of the output surface and the bottom surface has a micro-pattern, the micro-pattern consisting of a plurality of substantially identical micro-lenses, each micro-lens having a width, a length, and an orientation angle. The light guide plate further provides an area density $D(x, y)$ of the micro-lenses varies in a first direction y-axis that is parallel to the length direction and in a second direction x-axis that is parallel to the width direction for y between starting line y0 and ending line, the area density $D(x, y=y0)$ at the starting line y0 varying between a minimal value Dmin and a maximum value Dmax such that Dmin≥1% and 100≥Dmax/Dmin≥2, and wherein the area density $D(x,y)$ repeats in pitch P in the x-axis such that $D(x,y)=D(x+P,y)$.

7 Claims, 4 Drawing Sheets

LIGHT GUIDE PLATES HAVING A TWO-DIMENSIONAL PATTERN COMPRISING SUBSTANTIALLY IDENTICAL MICRO-LENSES

FIELD OF THE INVENTION

This invention generally relates to a light guide plate, and more particularly relates to a light guide plate having a two-dimensional micro-pattern consisting of substantially identical micro-lenses to reduce undesirable hot spot defects caused by discrete light sources.

BACKGROUND OF THE INVENTION

Liquid crystal displays (LCDs) continue to improve in cost and performance, becoming a preferred display type for many computer, instrumentation, and entertainment applications. Typical LCD mobile phones, notebooks, and monitors include a light guide plate for receiving light from a light source and redistributing the light more or less uniformly across the light guide plate. The light source, conventionally being a long, linear cold-cathode fluorescent lamp, has evolved to a plurality of discrete light sources such as light emitting diodes (LEDs). In a given size of an LCD, the number of LEDs has been steadily decreased to reduce cost. As a result, the pitch of LEDs becomes larger, which results in more noticeable hot spot problem (i.e., light near LEDs than between LEDs in the first few millimeters of the viewing area of the LCD). The hot spot problem occurs because light from discrete LEDs enters light guide plate non-uniformly, that is, more light is distributed near LEDs than between LEDs. Many light guide plates (LGPs) have been proposed to suppress the hot spot problem. Some LGPs have continuous grooves near their edge such as the ones disclosed in U.S. Pat. No. 7,097,341 (Tsai). Some LGPs have two sets of linear grooves of different pitches on their light output surface. Some LGPs have two or more sets of dots of different sizes. Other LGPs may combine grooves and dots of different sizes.

While the prior art light guide plates are capable of suppress the hot spot problem to a certain degree, they are still not satisfactory due to the complexity in the mass production of those LGPs. Thus, there remains a need for a light guide plate that can be easily made and is capable of suppressing the hot spot problem.

SUMMARY OF THE INVENTION

The present invention provides a light guide plate comprising: an input surface for receiving light from a plurality of discrete light sources, an output surface for emitting light, and a bottom surface opposing to the output surface, wherein at least one of the output surface and the bottom surface has a micro-pattern, the micro-pattern consisting of a plurality of substantially identical micro-lenses, each micro-lens having a width, a length, and an orientation angle; and wherein an area density $D(x, y)$ of the micro-lenses varies in a first direction y-axis that is parallel to the length direction and in a second direction x-axis that is parallel to the width direction for y between starting line y0 and ending line, the area density $D(x, y=y0)$ at the starting line y0 varying between a minimal value Dmin and a maximum value Dmax such that Dmin≥1% and 100≥Dmax/Dmin≥2, and wherein the area density $D(x,y)$ repeats in pitch P in the x-axis such that $D(x,y)=D(x+P,y)$.

The present invention further provides a backlight unit comprising a plurality of LEDs and a light guide plate, wherein the light guide plate comprises: an input surface for receiving light from a plurality of discrete light sources, an output surface for emitting light, and a bottom surface opposing to the output surface, wherein at least one of the output surface and the bottom surface has a micro-pattern, the micro-pattern consisting of a plurality of substantially identical micro-lenses, each micro-lens having a width, a length, and an orientation angle; and wherein an area density $D(x, y)$ of the micro-lenses varies in a first direction y-axis that is parallel to the length direction and in a second direction x-axis that is parallel to the width direction for y between starting line y0 and ending line, the area density $D(x, y=y0)$ at the starting line y0 varying between a minimal value Dmin and a maximum value Dmax such that Dmin≥1% and 100≥Dmax/Dmin≥2, and wherein the area density $D(x,y)$ repeats in pitch P in the x-axis such that $D(x,y)=D(x+P,y)$.

DETAILED DESCRIPTION OF THE INVENTION

Figure 1:
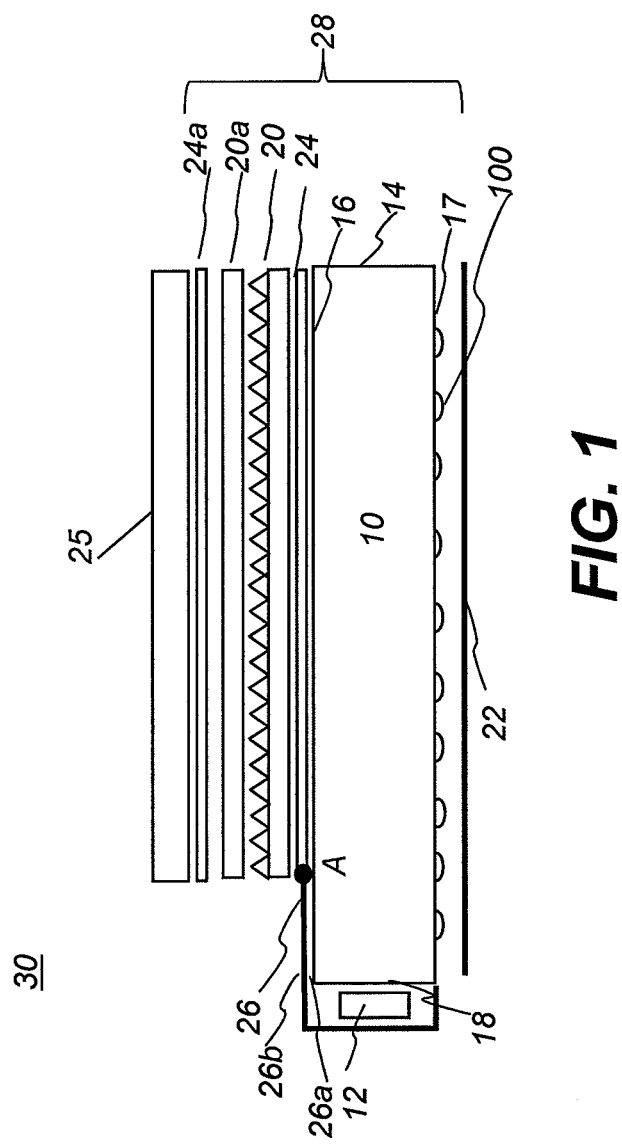
FIG. 1 shows a side view of a typical LCD comprising a plurality of optical components including a light guide plate of the present invention.

FIG. 1 shows schematically a side view of an LCD display apparatus 30 comprising an LCD panel 25 and a backlight unit 28. Backlight unit 28 comprises a plurality of optical components including one or two prismatic films 20, 20a, one or two diffusive films 24, 24a, a bottom reflective film 22, a top reflective film 26, and a light guide plate (LGP) 10. Light guide plate 10 is different from other optical components in that it receives light emitted from one or more light sources 12 through its input surface 18, redirects light through its bottom surface 17, end surface 14, output surface 16, side surfaces 15a, 15b (not shown) and reflective film 22, and eventually provides light relatively uniformly to other optical components. Targeted luminance uniformity is achieved by controlling the density, size, and/or orientation of micro-lenses 100 (sometimes referred to as discrete elements, or light extractors) on bottom surface 17 and/or output surface 16. Top reflective film 26 typically covers LGP 10 for about 2 to 5 millimeters to allow improved mixing of light. It has a highly reflective inner surface 26a. Top reflective film 26 sometimes may have a black outer surface 26b, and is therefore referred to as black tape. Typically the hot spot is evaluated from point A, which is at the end of top reflective film 26. From point A rightward is the viewing area.

Light guide plate 10 according to the present invention has a two-dimensional micro-pattern, which consists of a plurality of substantially identical micro-lenses, and the density of the micro-lenses varies in two dimensions. In the following, "substantially identical micro-lenses" and density of the micro-lenses are described.

While no two micro-lenses are perfectly identical, micro-lenses are considered to be "substantially identical" if they have the same shape and the same orientation. More specifically, the variation of their length, width, and depth is preferably within +/−3 μm (or 5.4% for a 56 μm sized micro-lens), and more preferably within +/−1 μm (or 1.8% for 56 μm size micro-lens); and the variation of their orientation angle is preferably within +/−5 degrees, and more preferably within +/−2 degrees.

Figure 2:
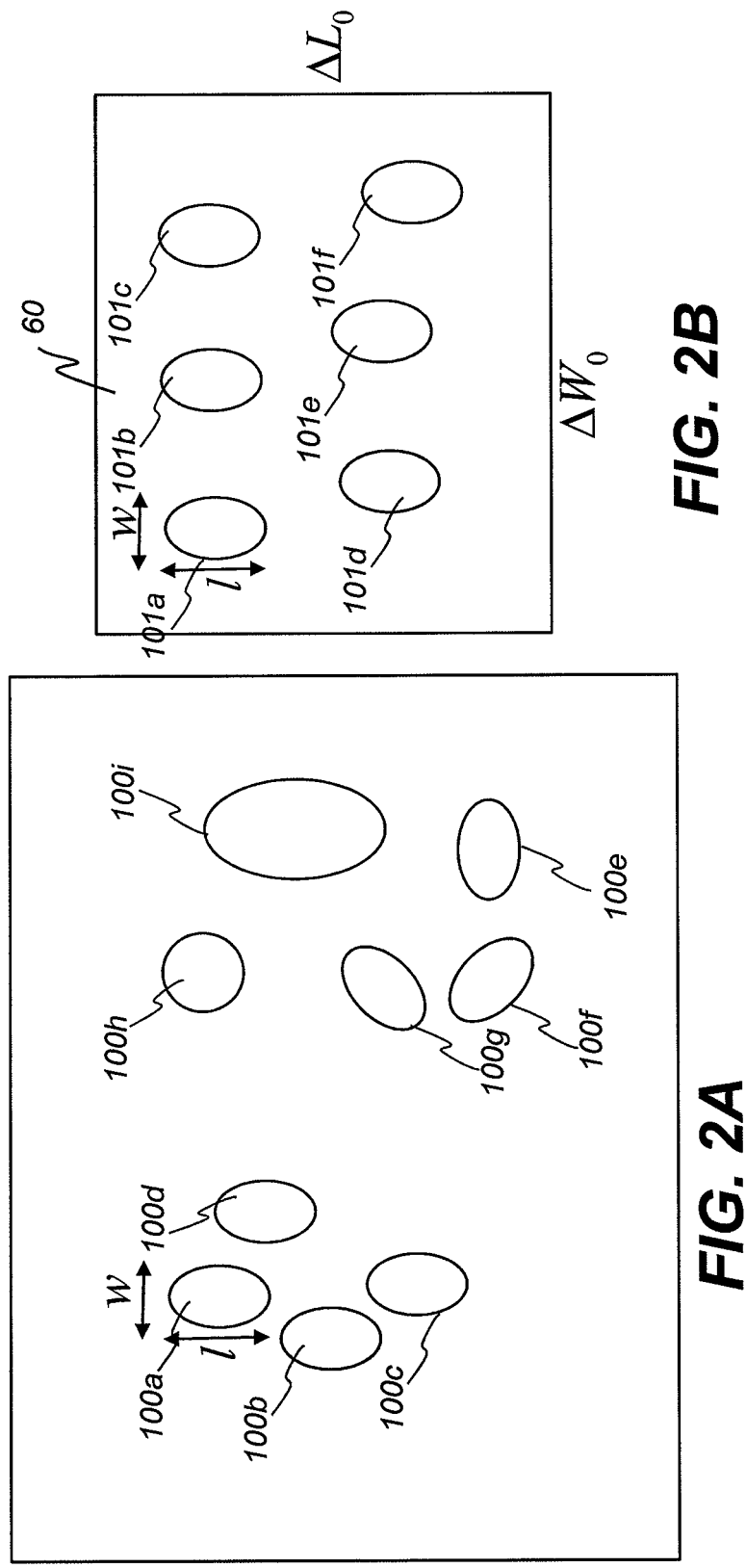
FIG. 2A shows a number of micro-lenses, some of which are substantially identical and useful for the present invention.
FIG. 2B shows a number of micro-lenses, explaining the area density.

Referring now to FIG. 2A, micro-lenses 100a, 100b, 100c, 100d are considered to be substantially identical because they all have the same shape and the same orientation. They have the same shape because they have the same width w, length l, and depth (not shown). Micro-lenses 100e, 100f, 100g are not substantially identical to micro-lens 100a because they have different orientation than micro-lens 100a though they have the same shape as micro-lens 100a. Micro-lens 100h is not substantially identical to micro-lens 100a because it is circular in shape while micro-lens 100a is elliptical. Micro-lens 100i is not substantially identical to micro-lens 100a because it is substantially larger than micro-lens 100a though they both are elliptical.

"Substantially identical" micro-lenses are made from the same process by substantially identical tools. The tools are considered to be substantially identical if they are made by the same process with the same target, or they differ from each other only by acceptable normal wear.

The advantage of using substantially identical micro-lenses is that they are easy to make because only one tool or multiple identical tools are needed. As a comparison, when two or more sets of micro-lenses with different sizes are targeted, two or more sets of tools are needed, or different processes are needed.

The number density ND is defined as number of micro-lenses per unit area, and the area density D is defined as total area of micro-lenses per unit area, where unit area is typically chosen in the order of 0.5-1.5 mm² for practical use. Referring to FIG. 2B, unit area 60 is defined by a width $\Delta W_0$ and a length $\Delta L_0$, containing six micro-lenses 101a-101f, each having a width $w_0$ and a length $l_0$. The number density ND=6/$(\Delta W_0 \Delta L_0)$, while the area density D=6$(w_0 l_0)/(\Delta W_0 \Delta L_0)$. The number density may be a fractional number when one or more lenses cross the boundary of the chosen unit area. In the following, the two-dimensional or one-dimensional density refers to the area density of micro-lenses.

Figure 3:
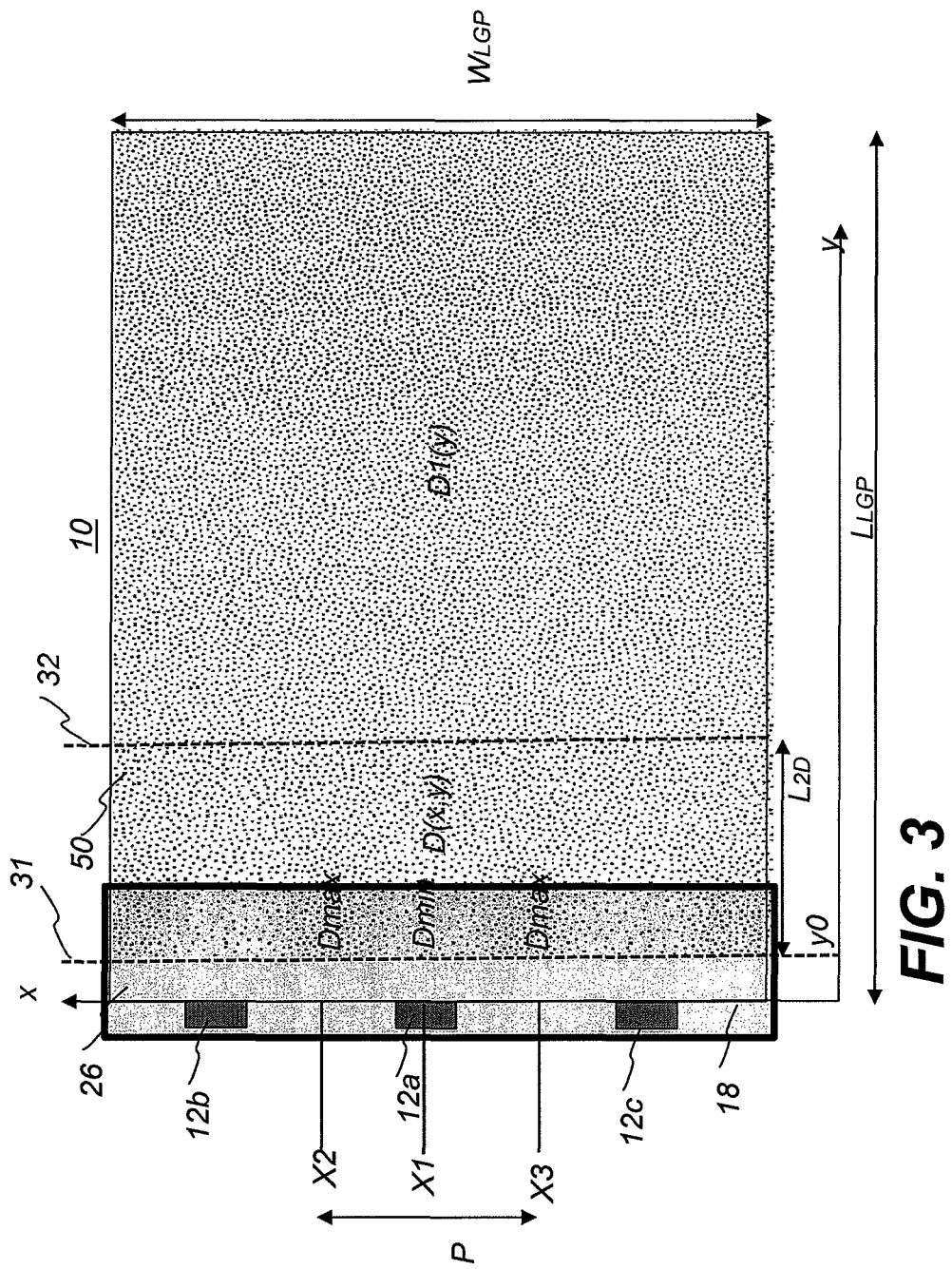
FIG. 3 shows schematically a top view of a light guide plate according to the present invention; and, FIG. 4 shows schematically a top view of a light guide plate according to a comparative example.

FIG. 3 shows schematically a top view of light guide plate 10 according to the present invention, along with a plurality of discrete light sources 12a, 12b, 12c having a pitch P. In practice, the number of discrete light sources can be 40 or more. The pitch P may vary from 4 mm to 10 mm. Light guide plate 10, having a width $W_{LGP}$ and a length $L_{LGP}$, has a micro-pattern 50 on one or both of its bottom surface 17 and output surface 16. In one example, micro-pattern 50 is on bottom surface 17, comprising micro-lenses having two-dimensional density D(x,y) and micro-lenses having one-dimensional density D1(y), where the x-axis is parallel to the width direction and the y-axis is parallel to the length direction.

The two-dimensional density D(x,y) varies in both the x-axis and y-axis, while the one-dimensional density D1(y) only varies in the y-axis. The two-dimensional density D(x,y) extends between starting line 31 at y=y0 and ending line 32 at y=y0+$L_{2D}$, where the length $L_{2D}$ represents the length of the two-dimensional density D(x,y) in the y-axis. At starting line 31 where y=y0, the density D(x,y0) varies between a minimal value Dmin and a maximum value Dmax, where Dmin occurs at X1 corresponding to the center position of a light source (for example light source 12a), while Dmax occurs at X2 or X3 corresponding to a half P away from the center of a light source. For a typical starting line, y0 varies from 0 to about 2.5 mm. When y0=0, the two-dimensional density D(x,y) starts at the beginning of light guide plate 10, aligned with input surface 18.

One unique feature of the two-dimensional density D(x,y) according to the present invention is that Dmin≥1% and the density contrast defined as the ratio Dmax/Dmin is between 2 and 100, that is 100≥Dmax/Dmin≥2.

Another unique feature of the two-dimensional density D(x,y) according to the present invention is that the ratio $L_{2D}/P$ is preferably smaller than 1, and most preferably less than or equal to 0.75. These two unique features enable the use of substantially identical micro-lenses to effectively suppress hot spot problem without causing other adverse effect.

According to one embodiment, the two-dimensional density D(x,y) repeats itself in the x-axis, that is D(x,y)=D(x+P,y) for y between y0 and y0+$L_{2D}$.

Figure 4:
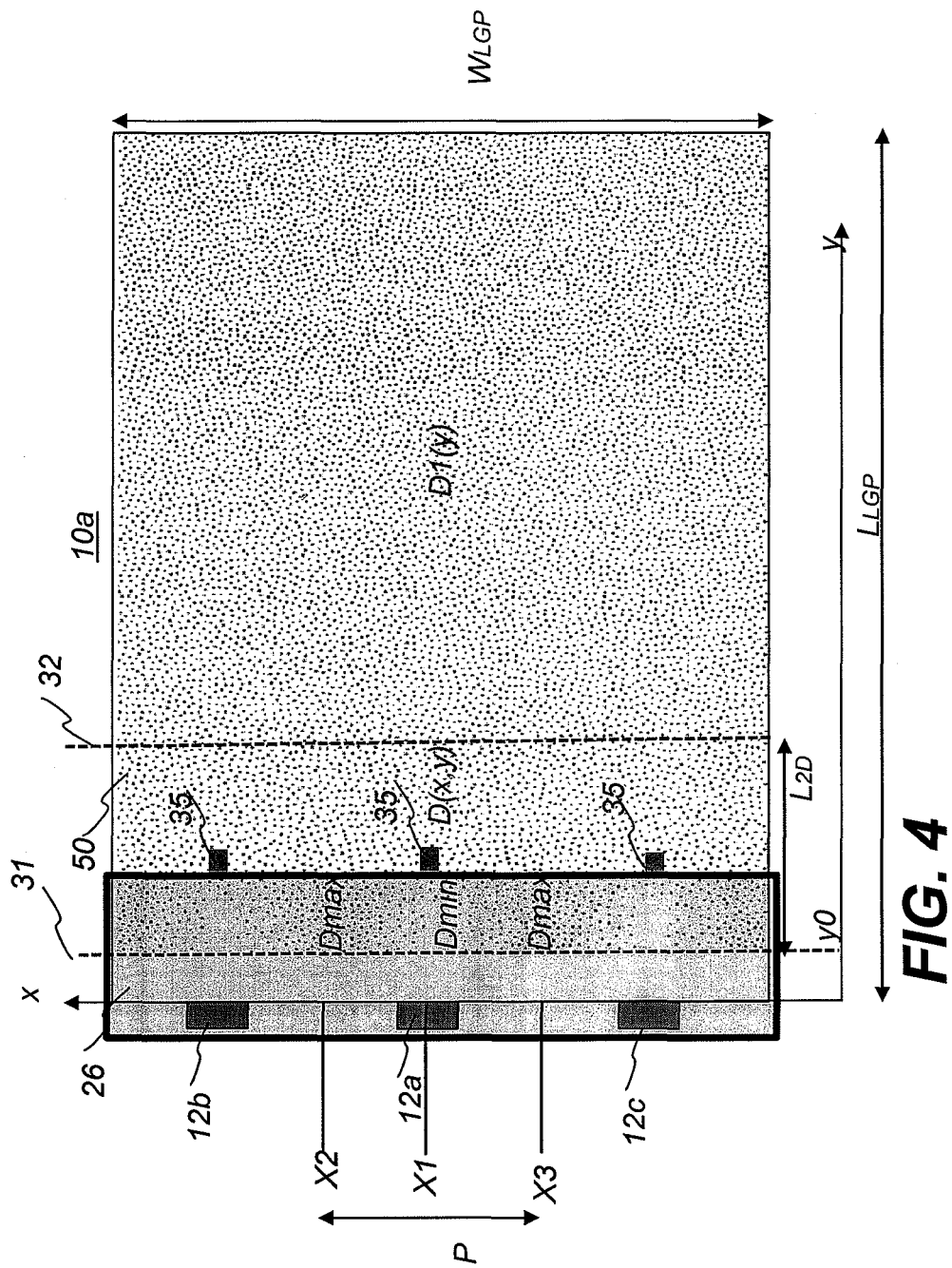

FIG. 4 shows schematically a top view of light guide plate 10a according to a comparative example, on which Dmin=0% compared to Dmin≥1% on light guide plate 10 according to the present invention. In this example, there is a large empty space in front of LEDs, and cosmetic defects are observed near area 35, close to the end of top reflective film 26. The cosmetic defects are believed to result from the abrupt change in density surrounding the 0% area.

EXAMPLES

In the following examples summarized in Table 1, various LGPs were made from polycarbonate, each having substantially identical micro-lenses of size around 78 μm by 78 μm. The area density D(x, y) repeated in pitch P in the x-axis, that is, D(x, y)=D(x+P, y), where P was the pitch of the density pattern, and was also the pitch of the LEDs in the backlight unit. Specifically the pitch P=6.3 mm. The thickness of LGPs was around 600 μm. The starting line y0 was about 1.2 mm from the beginning of light guide plates.

TABLE 1

Summary of inventive and comparative examples

|  | Dmin | Dmax/Dmin | $L_{2D}/P$ | Hot Spot |
|---|---|---|---|---|
| Inventive Example 1 | 5% | 2.7 | 0.71 | Good |
| Inventive Example 2 | 2.6% | 5.7 | 0.71 | Good |
| Comparative Example 1 | 6.2% | 1.8 | 0.71 | No good |
| Comparative Example 2 | 5% | 2.7 | 0.87 | No Good |
| Comparative Example 3 | 0% | >100 | 0.71-0.87 | No Good |

Both inventive example 1 and inventive example 2 were able to reduce the hot spot problem significantly without having other adverse effects. In both examples, Dmin≥1%, 100≥Dmax/Dmin≥3, and $L_{2D}/P$≤0.75.

In comparative example 1, the density contrast ratio Dmax/Dmin=1.8, was not high enough to suppress hot spot problem. In comparative example 2, the ratio $L_{2D}/P$ was larger than needed, indicating that the two-dimensional density D(x,y) should not extend too far into the light guide plate where the hot spot problem did not exist or had been somewhat suppressed by the high contrast density.

In comparative example 3, Dmin was purposely implemented at 0%, that is, no micro-lenses in front of LEDs. In this example, the density contrast Dmax/Dmin was infinitely large and greater than 100. It was thought that this density might have the greatest potential to reduce hot spots. Rather, the hot spot problem was still very noticeable primarily because the density contrast was too large. Consequently the boundary between 0% and finite neighboring density areas was projected into the viewing area through light propagating after the top reflective film 26, causing undesirable visual defect.

Many polymeric materials can be selected to practice this invention. The selected material must be sufficiently stiff and tough to minimize fracture and distortion during practical use. But most importantly, the selected material must possess high levels of transmittance over the visible range of the spectrum and low color. Materials useful in this invention include but are not limited to: Poly(methyl methacrylate) (PMMA), impact modified PMMA and other acrylic polymers, polycarbonates, poly cyclo olefins, cyclic block copolymers, polyamides, styrenics, polysulfones, polyesters, polyester-carbonates, and various miscible blends thereof.

The invention claimed is:

1. A light guide plate comprising:
an input surface for receiving light from a plurality of discrete light sources, an output surface for emitting light, and a bottom surface opposing to the output surface,
wherein at least one of the output surface and the bottom surface has a micro-pattern, the micro-pattern consisting of a plurality of substantially identical micro-lenses, each micro-lens having a width, a length, and an orientation angle; and
wherein an area density $D(x, y)$ of the micro-lenses varies in a first direction y-axis that is parallel to the length direction and in a second direction x-axis that is parallel to the width direction for y between starting line y0 and ending line, the area density $D(x, y=y0)$ at the starting line y0 varying between a minimal value Dmin and a maximum value Dmax such that Dmin≥1% and 100≥Dmax/Dmin≥2, and wherein the area density $D(x, y)$ repeats in pitch P in the x-axis such that $D(x,y)=D(x+P,y)$.

2. The light guide plate of claim 1, wherein the variation of the width, length and depth of the plurality of micro-lenses is within 1.8 percent.

3. The light guide plate of claim 1, wherein the variation of the orientation angle of the plurality of micro-lenses is within 2 degrees.

4. The light guide plate of claim 1, wherein at the ending line the area density $D(x,y)$ converges to a density function that only varies in the y-axis.

5. The light guide plate of claim 1, wherein the length between the ending line and starting line is $L_{2D}$, and the ratio $L_{2D}/P$ is less than and equal to 0.75.

6. A backlight unit comprising a plurality of LEDs and a light guide plate, wherein the light guide plate comprises:
an input surface for receiving light from a plurality of discrete light sources, an output surface for emitting light, and a bottom surface opposing to the output surface,
wherein at least one of the output surface and the bottom surface has a micro-pattern, the micro-pattern consisting of a plurality of substantially identical micro-lenses, each micro-lens having a width, a length, and an orientation angle; and
wherein an area density $D(x, y)$ of the micro-lenses varies in a first direction y-axis that is parallel to the length direction and in a second direction x-axis that is parallel to the width direction for y between starting line y0 and ending line, the area density $D(x, y=y0)$ at the starting line y0 varying between a minimal value Dmin and a maximum value Dmax such that Dmin≥1% and 100≥Dmax/Dmin≥2, and wherein the area density $D(x, y)$ repeats in pitch P in the x-axis such that $D(x,y)=D(x+P,y)$.

7. The backlight unit of claim 6 further comprising a top reflective film covering the beginning line of the area density $D(x,y)$.

* * * * *